United States Patent
Holighaus et al.

[11] Patent Number: 5,917,102
[45] Date of Patent: Jun. 29, 1999

[54] DEVICE FOR DEPOLYMERIZING USED AND WASTE PLASTICS

[75] Inventors: Rolf Holighaus, Haltern; Klaus Niemann, Oberhausen; Klaus Strecker, Gelsenkirchen; Dieter Ullrich, Essen; Christian Hecka, Gladbeck, all of Germany

[73] Assignee: VEBA OEL AG, Gelsenkirchen, Germany

[21] Appl. No.: 08/737,587

[22] PCT Filed: May 16, 1995

[86] PCT No.: PCT/EP95/01851

§ 371 Date: Mar. 21, 1997

§ 102(e) Date: Mar. 21, 1997

[87] PCT Pub. No.: WO95/32262

PCT Pub. Date: Nov. 30, 1995

[30] Foreign Application Priority Data

May 20, 1994 [DE] Germany ............... 44 17 721
Aug. 10, 1994 [DE] Germany ............... 44 28 355

[51] Int. Cl.⁶ ............... C07C 1/00; B01J 19/24
[52] U.S. Cl. ............... 585/241; 585/240; 208/400; 208/415; 208/424; 208/426; 201/2.5; 201/25; 422/184.1; 422/198; 422/203; 422/232; 422/235; 422/236

[58] Field of Search ................ 585/241, 240; 208/400, 415, 424, 426; 201/2.5, 25; 422/184.1, 189, 195, 198, 203, 232, 234, 235, 236, 901

[56] References Cited

FOREIGN PATENT DOCUMENTS

A 3814463  11/1989  Germany.
A 41 24697  1/1993  Germany.
A 4311034  10/1994  Germany.

*Primary Examiner*—Bekir L. Yildirim
*Attorney, Agent, or Firm*—Oblon, Spivak, McClelland, Maier & Neustadt, P.C.

[57] ABSTRACT

The invention relates to a device for depolymerizing used and waste plastics, comprising a closed reactor and a circulation system the mildly heating of the reactor contents connected to the reactor, as well as to a process for depolymerizing used and waste plastics. To protect the circulation system from erosion by solid particles contained in the reactor contents, the reactor is designed so that the reactor contents drawn off into the circulation system traverse a riser section integrated into the reactor for removing fairly coarse solid particles having correspondingly high settling rate before entry into the take-off line.

22 Claims, 4 Drawing Sheets

DEVICE FOR DEPOLYMERIZING USED AND WASTE PLASTICS

BACKGROUND OF THE INVENTION

1. Field of the Invention

The invention relates to a device for depolymerizing used and waste plastics, and also to an associated process.

2. Discussion of the Background

In a process for re-treating carbon-containing waste, EP 0 236 701-A1 describes a thermal pretreatment in the presence or absence of hydrogen of organic wastes of synthetic origin as a preliminary stage for a subsequent hyrdogenating treatment. From the description and also from the examples it emerges that such a pretreatment can be carried out in a stirred reactor.

EP 0 512 482 A2 describes a thermal treatment of such synthetic organic wastes in which no coke formation or only a small amount of coke formation occurs in the absence of hydrogen.

Used plastics such as those which have to be recycled, for example, as a result of the German Packaging Regulation, have an impurity content of up to 10% by weight. Some of these impurities are present as fine fillers and pigments which have virtually no settling rate in the liquefied used plastic. Other inert constituents are, for example, adhering metal parts, for example aluminium lids or thin aluminium layers made of composite foils.

In the preliminary sorting and ancillary processing, it is not possible, or possible only at extremely high expense, to extract these metal foils or to remove them mechanically/manually. At present, the ancillary processing of used plastics permits particle sizes of up to 10 mm. In the extreme case, even metal agglomerates up to this size are therefore possible. The metal parts entrained with the used plastic have, because of their density and sizes, a marked to high sedimentation rate in liquefied plastic. They can therefore erode pumps and other sensitive elements, which may result in their destruction.

In order to be able to depolymerize used and waste plastics thermally, it is necessary to introduce a large amount of energy at a high temperature level (about 400° C.). Plastics are very sensitive to overheating. Such overheating results in uncontrolled decomposition with undesirable side reactions.

SUMMARY OF THE INVENTION

The object of the invention is to eliminate the disadvantages described in the prior art, in particular in regard to overheating and erosion problems.

It is therefore proposed, according to the invention, to convey the reactor contents via a circulation system connected to the reactor as a protection against overheating. Said circulation system comprises, in a preferred embodiment, an oven/heat exchanger and a high-output pump. The advantage of this process is that a high circulating flow via the external oven/heat exchanger achieves the result that, on the one hand, the necessary temperature overshoot of the material contained in the circulation system remains low and, on the other hand, favourable transfer conditions in the oven/heat exchanger make possible moderate wall temperatures. As a result, local overheating and, consequently, uncontrolled decomposition and coke formation are avoided to a very substantial extent. The reactor contents are thus heated under comparatively very mild conditions.

DETAILED DESCRIPTION OF THE PREFERRED EMBODIMENTS

Figure 1:
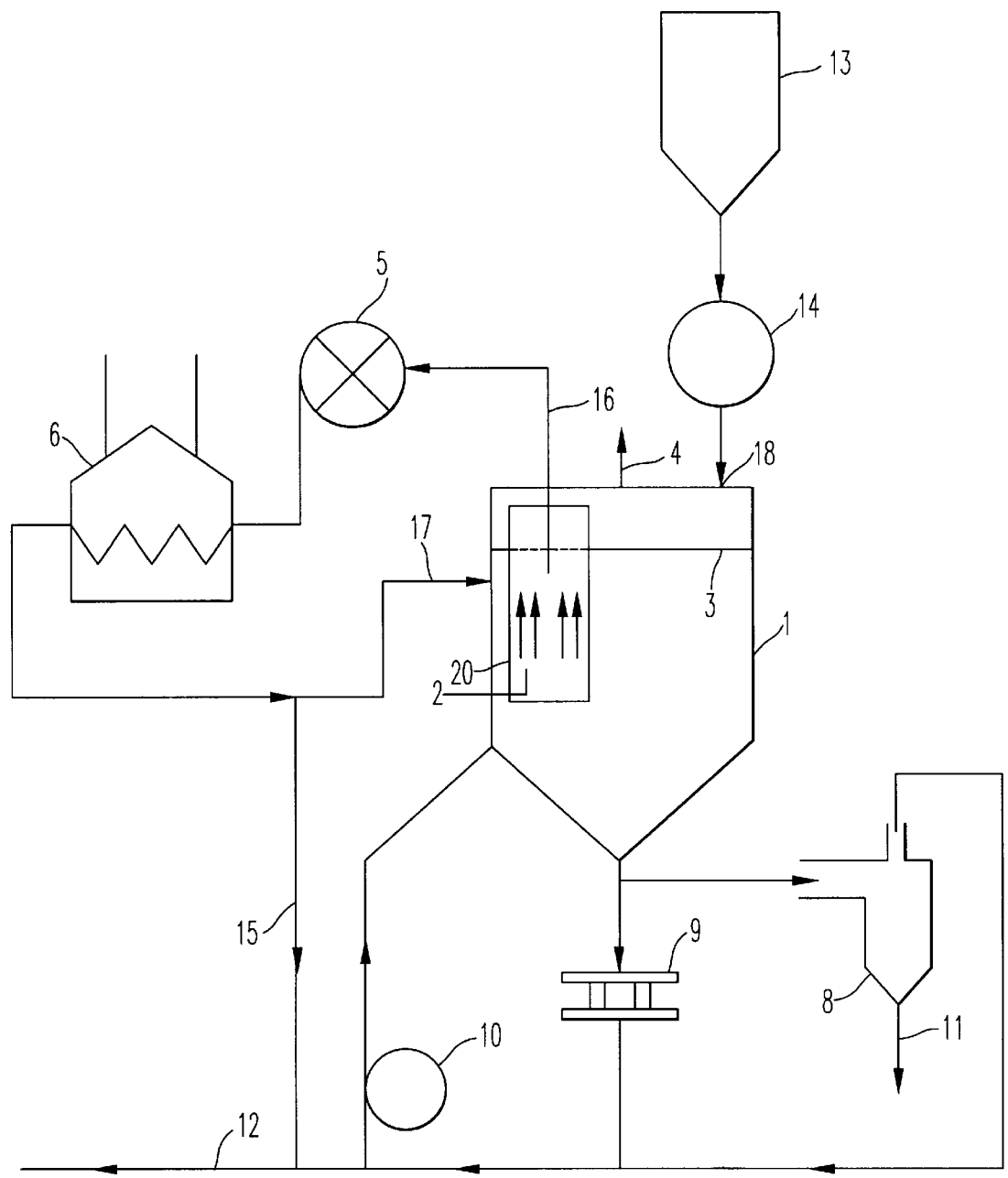
FIG. 1 shows a preferred embodiment of the device of the invention.

A high circulation flow can preferably be achieved with high-output rotary pumps. However, just like other sensitive elements of the circulation system, these have the disadvantage that they are sensitive to erosion.

According to the invention, this can be combatted in that the reactor contents drawn off into the circulation system traverse a riser section integrated into the reactor in which fairly large solid particles having correspondingly high settling rate are removed before entry into the take-off line.

The object of the invention was consequently achieved by a device for depolyrmerizing used and waste plastics comprising a closed reactor (1) having a) charging device (18) for the used and waste plastics, preferably in the head region of the reactor, b) discharging device (7) for the depolymerized material, preferably in the base region of the reactor, c) device (4) for removing the gases produced and the condensable products in the head region of the reactor, characterized in that there is connected to the reactor a circulation system for the mild heating of the reactor contents which traverse a riser section (2) integrated into the reactor for removing fairly coarse solid particles having correspondingly high settling rate before entry into the take-off line (16).

The reactor is therefore designed in such a way that the take-off device for the circulation (circulation system) is situated at the end of a riser section for the essentially liquid reactor contents. Particles having fairly high settling rate which are responsible for the erosion can be kept out of the circulation by suitably setting the rise velocity, which is essentially determined by the dimension of the riser section and of the circulation flow. In a particular embodiment, the riser section is formed inside the reactor in the form of a pipe fitted essentially vertically in the reactor (cf. FIG. 1). In another preferred embodiment, instead of a pipe, the riser section may also be formed in that a partition subdivides the reactor into segments (cf. FIG. 2). The pipe or the partition do not terminate at the reactor lid, but extend beyond the filling level. The pipe and partition are so far from the base of the reactor that the reactor contents can flow into the rising section unimpeded and without fairly large turbulence.

The solids are taken off at the base of the reactor together with the amount of depolymerized material which is to be delivered for further processing. So that the sedimented inert substances are removed as completely as possible from the reactor, the discharging device for the depolymerized material is preferably fitted in the lower region, in particular at the base of the reactor. In order to promote further as complete removal as possible of the inert substances, the reactor is preferably tapered in the base region and is formed in an advantageous embodiment as a conical jacket standing on its tip.

The invention furthermore relates to a process for depolymerizing used and waste plastics, characterized by their treatment at elevated temperature in a device in accordance with one of claims 1 to 14. Preferably, this is based on the process from DE 43 11 034.7.

According to this process, the reaction products are divided up into three main product flows:

1. A depolymerized material, usually in an amount of between 25 and 85% by weight relative to the plastics mixture used, which can be divided up, depending on the composition and the particular requirements, into product subflows which can be fed, for example, to a liquid-phase hydrogenation, a high-pressure gasification and/or, optionally, to a carbonization (pyrolysis). This involves essentially heavy hydrocarbons which boil around >480° C. and which contain all the inert substances such as aluminium foils, pigments, fillers, glass fibres, introduced into the process with the used and waste plastics.

2. A condensate in an amount of up to 50% by weight and over, relative to the plastics mixture used, which boils in a range between 25° C. and 520° C. and may contain approximately 1000 ppm of organically bound chlorine. This condensate can be converted, for example by hydrotreating using fixed, commercially available Co/Mo or Ni/Mo catalysts, into a high-grade synthetic crude oil (syncrude) or, alternatively, introduced directly into chlorine-tolerating industrial chemical processes as hydrocarbon-containing base substance.

3. A gas in amounts of up to 20% by weight, relative to the plastics mixture used, which usually contains, in addition to methane, ethane, propane and butane, gaseous hydrogen chloride as well as readily volatile, chlorine-containing hydrocarbon compounds. The hydrogen chloride can be washed out, for example with water, from the gas flow to produce a 30%-strength aqueous hydrochloric acid. The residual gas can be freed of organically bound chlorine by hydrogenation in the liquid phase or in a hydrotreater and fed, for example, to the refinery gas processing.

The advantage of this process is essentially that the inorganic minor constituents of the used or waste plastics are concentrated in the liquid phase and, optionally, removed, whereas the condensate, which does not contain these constituents, can be processed further by less expensive processes. In particular, by optimally adjusting the process parameters of temperature and dwell time, the result can be achieved that, on the one hand, a relatively high proportion of condensate is produced and, on the other hand, the viscous depolymerized material remains pumpable under the process conditions.

The invention furthermore relates to a process which is carried out by means of the device according to the invention. This is a process for processing used or waste plastics for the purpose of producing chemical raw materials and liquid fuel components by depolymerizing the feedstocks to form a pumpable as well as a volatile phase, and separation of the volatile phase into a gas phase and a condensate or condensable depolymerization product which can be subject to standard refinery procedures, the pumpable phase remaining after separating the volatile phase being subject, for example, to a liquid-phase hydrogenation, gasification, carbonization or a combination of these process steps.

A temperature range for the depolymerization which is favourable according to the invention is 150 to 470° C. Particularly suitable is a range from 250 to 450° C. The dwell time may be 0.1 to 10 h. A range of 0.5 to 5 h has proved particularly favourable. In the process according to the invention, the pressure is a less critical variable. Thus, it may be eminently preferable for the process to be carried out at reduced pressure, for example if volatile constituents have to be drawn off for reasons associated with the process. However, relatively high pressures are also practicable, but require a higher expenditure on equipment. In general, the pressure should probably be in the range from 0.1 to 50 bar, in particular 0.5 to 5 bar. Preferably, the process can be carried out satisfactorily at normal pressure or slightly above it (up to about 2 bar), which markedly reduces the expenditure on equipment. To degas the depolymerized material as completely as possible and to increase the proportion of condensate further, the process is advantageously carried out at slightly reduced pressure, down to about 0.2 bar.

The depolymerization can preferably be carried out with the addition of a catalyst, for example a Lewis acid, such as aluminium chloride, a free-radical-forming substance, for example a peroxide compound, or a metal compound, for example a zeolite impregnated with a heavy-metal salt solution.

Further preferred embodiments of the process consist in depolymerization under inert gas, i.e. gas which behaves inertly towards the feedstocks and the depolymerization products, for example $N_2$, $CO_2$, CO or hydrocarbons. The process can also be carried out by introducing stripper gases and stripper vapours, such as nitrogen, steam or hydrocarbon gases. Basically, it may be regarded as an advantage of the method that no hydrogen has to be added in this process step and that the entire reaction product is not subjected to the expensive liquid-phase hydrogenation.

Suitable as liquid auxiliary phase, or solvent or solvent mixture, are, for example, spent organic solvents, that is to say solvent wastes, incorrect production charges of organic liquids, used oils or fractions from petroleum refining, for example vacuum residue. A particular advantage of the process is that a liquid auxiliary phase does not have to be added to the used or waste plastic employed. The addition of solvents or so-called pasting and slurrying oils can be dispensed with. This applies equally to extraneous oils and to recirculated internal process oils.

The depolymerization can be carried out in a standard reactor, for example a stirred-tank reactor, which has in addition a riser section and to which an external circulation system is connected for heating the reactor contents. The reactor is designed for the appropriate processing parameters, such as pressure and temperature and must also be resistant to the acidic constituents, such as hydrogen chloride, which may be produced.

The depolymerization is preferably carried out under turbulent flow conditions, for example using mechanical stirrers, but alternatively by circulating the reactor contents. This applies, however, only to the reactor section which is not designed as a riser section.

Compared with the subsequent working-up steps, such as hydrotreating, carbonization, hydrogenation or gasification, the expenditure on equipment for the depolymerization is comparatively low. This applies, in particular, if the process is carried out in the vicinity of normal pressure, that is to say in the range between 0.2 and 2 bar. In contrast to hydrodepolymerization, the expenditure on equipment is also markedly lower. It is reduced still further as a result of the fact that the addition of solvents, extraneous oils or recirculated internal oils can be dispensed with completely as pasting or slurrying oils. Despite this comparatively simple provision of the depolymerization reactor with equipment, the load on the subsequent process steps can be reduced by up to 50% and over with optimum process control of the pretreatment. At the same time, the depolymerization intentionally produces a higher proportion of condensable hydrocarbons, which can be worked up to form valuable products by known and comparatively less expensive processes. In addition, after removal of gas and condensate, the depolymerized material produced in the pretreatment is easy to handle since it remains pumpable and, in this form, is a good feedstock for the subsequent process stages.

The plastics used in the present process are, for example, mixed fractions from waste collections, inter alia, by Duale System Deutschland GmbH (DSD). Said mixed fractions contain, for example, polyethylene, polypropylene, polyvinyl chloride, polystyrene, polymer blends such as ABS as well as polycondensates, for example polyethylene terephthalate (PET). Plastic production wastes, commercial plastic packaging wastes, residual, mixed or pure fractions from the plastic-processing industry can also be used, and the chemical composition of these plastics wastes is not critical for them to be suitable to be used in the present process. Suitable feedstock products are also elastomers, industrial rubber products or used tires in suitably comminuted form.

The used or waste plastics employed originate, for example, from moulded parts, laminates, composite materials, sheets or synthetic fibres. Examples of halogen-containing plastics are chlorinated polyethylene (PEC), polyvinyl chloride (PVC), polyvinylidene chloride (PVDC), chloroprene rubber, to name just a few important representatives. However, in particular, sulphur-containing plastics, for example polysulphones or rubbers crosslinked with sulphur bridges as in used tires, also accumulate in large amounts and, if the appropriate equipment for the precomminution and presorting into plastic and metal constituents is available, they can be depolymerized and worked up further to produce chemical raw materials or, alternatively, fuel components. The hydrogen chloride produced in the process during these pretreatment stages or chemical conversion processes is chiefly converted into the offgas which is removed and fed to further recycling.

Among the used or waste plastics to be employed in the present process, synthetic plastics, elastomers and, in addition, also modified natural substances can be used. These include not only the polymers already mentioned, in particular thermoplastics, but also thermosets and polyadducts. The products manufactured therefrom comprise semifinished products, individual parts, components, packagings, storage and transport containers, as well as consumer products. The semifinished products also include panels and boards (printed circuit boards) as well as laminates which may still contain some metal coatings and which, like the other products to be employed, can be separated, if necessary, from metal, glass or ceramic constituents by means of suitable classification processes after precomminution to particle or fragment sizes of 0.5 to 50 mm.

The used and waste plastics mentioned accumulate, for example as a result of collections by the DSD, in mixtures and conglomerates of varying composition and may contain up to 10% by weight, possibly up to 20% by weight of inorganic minor constituents, such as pigments, glass fibres, fillers, such as titanium oxide or zinc oxide, flame retardants, pigment-containing printing inks, soot and also metals, for example, metallic aluminium. Usually these plastic mixtures are employed in comminuted form.

FIG. 1 shows an exemplary embodiment of the device according to the invention. Used and waste plastic is introduced, for example pneumatically, into reactor (1) from feedstock container (13) via charging device (18) by means of a gastightly closing dispensing device (14). A cellular wheel sluice, for example, is well suited as such a dispensing device. The depolymerized material can be removed together with the inert substances it contains via device (7) at the base of the reactor. The charging of the plastic as well as the removal of the depolymerized material advantageously takes place continuously and is arranged so that a certain filling level (3) of the reactor content is approximately maintained. Gases and condensable products produced are drawn off from the head region of the reactor by means of device (4). The reactor contents are fed via take-off line (16) to the circulation system via pump (5) for the purpose of mild heating in oven/heat exchanger (6) in order to be recirculated to reactor (1) via inlet (17). Disposed vertically in reactor (1) is pipe (20) which forms a riser section (2) for the reactor recirculating flow.

The flow of depolymerized material removed from the reactor is smaller by a factor of 10 to 40 than the recirculating flow. Said flow of depolymerized material is passed through wet-grinding mill (9) in order to bring the inert constituents it contains to a size permissible for the further processing. The flow of depolymerized material may, however, also be fed via a further separating device (8) in order to be substantially freed from the inert constituents. Suitable separating devices are, for example, hydrocyclones or decanters. Said inert constituents (11) can then be removed separately and, for example, fed to a recycling system. Optionally, some of the flow of depolymerized material may also be fed via the wet-grinding mill or via the separating device and via a pump (10) back into the reactor again. The remainder is fed (12) to the further processing, for example liquid-phase hydrogenation, carbonization or gasification. Some of the depolymerized material can be fed gasification. Some of the depolymerized material can be taken directly via line (15) from the circulation system as feed for further processing.

Figure 2:
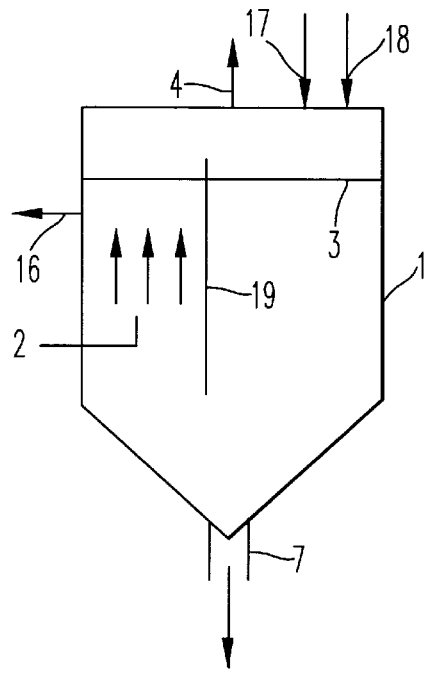
FIG. 2 shows a reactor with a similar construction to that in FIG. 1, with the difference that the riser section is not formed as a pipe, but by a reactor segment which is separated from the remaining reactor contents by a partition.

FIG. 2 shows a reactor of similar construction to that in FIG. 1, with the difference that the riser section is not formed as a pipe, but by a reactor segment which is separated from the remaining reactor contents by a partition (19).

If used and waste plastics from domestic collections are used, the inert constituents (11) removed by means of the separating device (8) are chiefly composed of aluminium, which can be fed in this way to a material recycling system. This removal and recycling of aluminium additionally opens up the possibility of also materially recycling composite packagings completely. Said recycling can be carried out together with plastic packagings. This offers the advantage that a separation of these packaging materials can be omitted. Composite packagings are usually composed of paper or cardboard combined with a plastic and/or aluminium sheet. In the reactor, the plastic component is liquefied, the paper or the cardboard is decomposed into primary fibres which follow the liquid because of their low tendency to sedimentation, and the aluminium can be extracted substantially separately. Plastic and paper are fed to a raw-material recycling system after depolymerization has been carried out.

Figure 3:
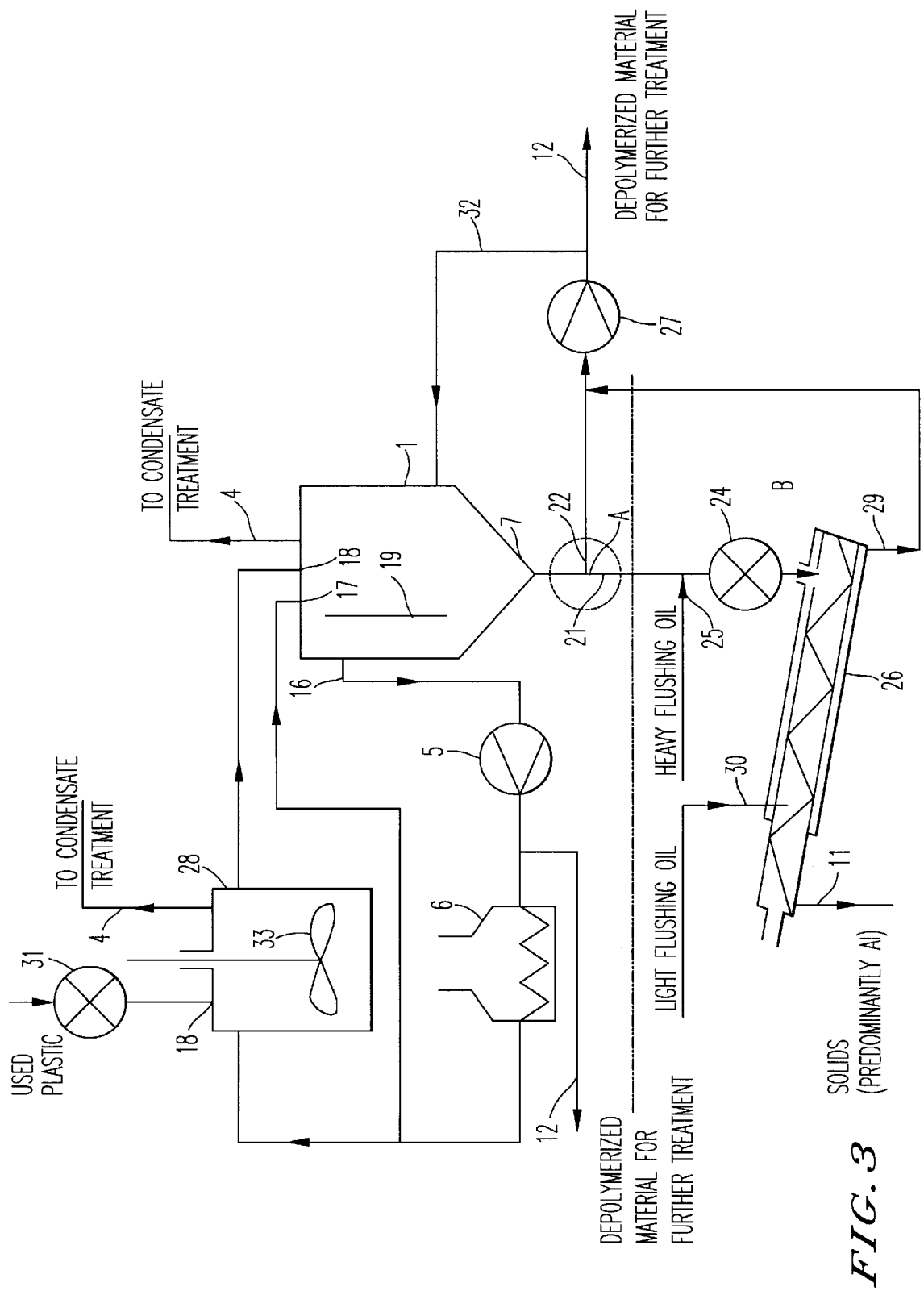
FIG. 3 shows a depolymerization system containing two containers which can be operated at a different temperature level.

FIG. 3 shows a depolymerization system comprising two containers which can be operated at different temperature level, preferably with a temperature rise from the first container to the second. The first depolymerization container (28) is preferably fitted with a stirrer (33) in order to be able to mix the used and waste plastics fed via sluice (31) rapidly into the hot depolymerized material. The downstream second depolymerized material container (1) corresponds to that in FIG. 2. The circulation system for providing mild heating, essentially comprising pump (5) and oven/heat exchanger (6), is therefore low in solids. The depolymerized material, including the solid constituents, is drawn off at the base of the reactor. The solid/liquid quantitative ratio at the discharging device (7) of the container (1) may be between 1:1 and 1:1000.

According to the present invention, an essentially vertical downcomer section (21) having a branch fitted essentially at right angles thereto is connected immediately downstream of the discharging device (7).

Downcomer section (21) and branch (22) are designed as a T-shaped pipe in a preferred embodiment.

The branch may additionally be equipped with mechanical separating aids (23).

A flow of organic constituents of the depolymerized material which are essentially liquid under the present conditions can be diverted via branch (22). The depolymerized material is fed via pump (27) for further processing or may also be fed back, at least partially, to reactor (1) via line (32).

The amount diverted may be up to 1000 times the amount of solids removed. In the extreme case and, if necessary, temporarily, nothing may also be diverted via branch (22). By fixing the amount of depolymerized material drawn off via the branch (22), suitable flow ratios for reliably removing the solids can be guaranteed. At the same time, the diverted flow should be dimensioned so that solid particles are, as far as possible, not entrained to an appreciable extent. Preferably, the ratio of amount of solids removed to the amount diverted is 1:50 and 1:200.

Downcomer section (21) or the downcomer pipe is provided with a sluice (24) at the lower and in a special embodiment. A charging device (25) for flushing oil is fitted above said sluice.

Figure 5:
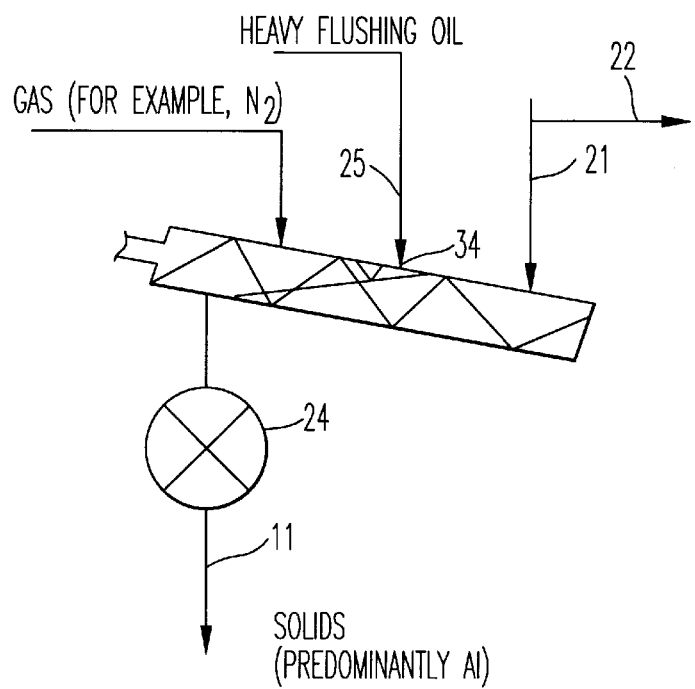
FIG. 5 shows a processing alternative in which a separating device is connected immediately downstream of the downcomer section.

FIG. 5 shows a processing alternative in which a separating device (26) is connected immediately downstream of the downcomer section (21). A charging device (25) for flushing oil is preferably fitted to the former.

Flushing oil which has higher density than that of the depolymerized material is added by means of charging device (25) in an amount which causes a low, upwardly directed flow velocity of the liquid inside the downcomer section between charging device (25) and branch (22). This achieves the result that the downcomer section (21), or the downcomer pipe, is always filled with relatively fresh flushing oil below the branch (22). In this part of the downcomer section (21), a so-called stable layering with flushing oil is present. If nothing is diverted via branch (22), the flushing oil rises in the downcomer section (21) and ultimately enters reactor (1).

While the bulk of the organic constituents of the depolymerized material is preferably diverted through branch (22), the chiefly inorganic solid particles which are contained in the depolymerized material and which have an adequate settling rate pass through that part of the downcomer section (21) filled with flushing oil. For this purpose, the organic depolymerized material constituents still adhering to the solid particles are washed off or dissolved in the flushing oil.

The difference in density between depolymerized material and flushing oil should be at least 0.1 g/ml, preferably 0.3 to 0.4 g/ml. At a temperature of 400° C., the depolymerized material has a density in the order of magnitude of 0.5 g/ml. As a suitable flushing oil, use can be made, for example, of a vacuum gas oil which is heated to approximately 100° C. and has a density of approximately 0.8 g/ml.

The length of that part of the downcomer section (21) filled with flushing oil is dimensioned so that the solid particles are at least substantially free of adhering organic depolymerized material constituents at the lower end of the downcomer section (21). It is also dependent on the nature, composition, temperature as well as the amounts of depolymerized material fed through and the flushing oil used. The person skilled in the art can determine the optimum length of that part of the downcomer section (21) filled with flushing oil by relatively simple experiments.

As shown in FIG. 3, the solid particles are discharged with some of the flushing oil via sluice (24). Sluice (24) serves to separate the upstream and the downstream parts of the system in terms of pressure. A cellular wheel sluice is preferably used. However, other sluice types, such as, for example, cyclic sluices, are suitable for this purpose. The mixture discharged has a solids content of about 40 to 60% by weight.

Expediently, sluice (24) is followed by a further separating device (26) for separating flushing oil and solid particles.

A trough scraper or a conveyor worm is preferably used as separating device (26). These are directed upwards at an angle in the conveyance direction. An angle to the horizontal of 30 to 60°, in particular about 45°, is preferred.

FIG. 5 shows another process variant. In this case, the solid particles traverse the separating device (26) immediately after passing through the downcomer section (21). A desired liquid level (34) is established by means of a gas cushion, for example of nitrogen, and the charging of the separating device (26) with flushing oil. The solid particles, which are substantially freed from flushing oil, are then discharged via sluice (24), for example a cellular wheel sluice or a cyclic sluice.

FIG. 3 shows diagrammatically a dehydrating worm (26) which is able to function as a suitable separating device. A flushing oil having a fairly low density, for example a middle distillate oil, can also be applied via line (30). As a result, the heavier flushing oil is washed off the solid particles. The low-viscosity light flushing oil can be removed at least substantially from the solid particles more simply and without fairly great difficulties. The spent flushing oil can be removed via line (29) or at least partially introduced into the depolymerized material diverted via branch (22). The separating device (26) preferably operates in this case under atmospheric conditions. The solid particles removed in this way are discharged via line (11) and can be fed to a recycling system.

If the used and waste plastics employed are those from domestic collections, the solid discharged via line (11) is chiefly composed of metallic aluminium which can be fed to a subsequent material recycling of this material.

Figure 4:
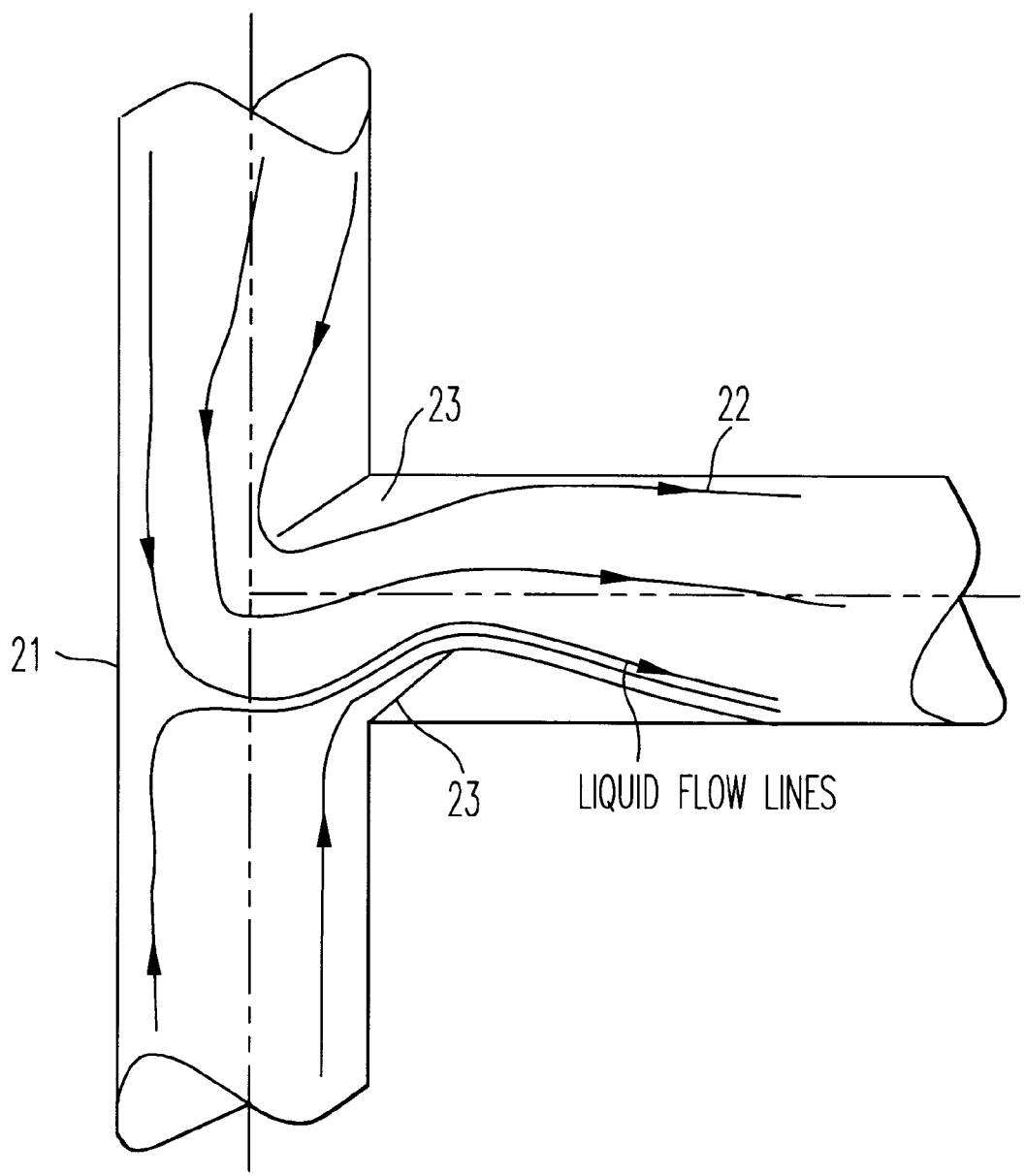
FIG. 4 shows an enlarged detailed of the T-shaped arrangement of the downcomer section and branch of FIG. 3.

FIG. 4 shows as an enlarged detail of FIG. 3 the T-shaped arrangement of downcomer section (21) and branch (22), Also shown are mechanical separating aids (23) and the flow conditions which are shown diagrammatically by means of arrows.

EXAMPLE

Physical characteristics

Heat required to depolymerize used plastics: 350 kWh/t
Depolymerization temperature: 400° C.
Permissible temperature overshoot: 25° C.

Reactor design
  Throughput: 10 t/h
  Mean dwell time: 4 h
  Circulation required in circulation system: 370 m³/h The integrated sedimentation section, which is designed so that the discharge of aluminium foil having a thickness of >0.1 mm and measuring >1×1 mm is prevented, is dimensioned as follows:

Equivalent diameter of the aluminium foil
  calculated as a sphere having the same volume: 0.576 mm
  Sedimentation rate as sphere: 0.15 m/s
  Sedimentation rate as platelet: 0.07 m/s
  Viscosity of the reactor contents at 175° C.: 200 m Pas Result
  Cross section of sedimentation section: 1.47 m²
  Length of sedimentation section: 4.4 m By arranging such a riser section in the reactor, the result was achieved that only solid particles having a very low sedimentation tendency were pumped through the circulation system. Practically no erosion of the circulation pump occurred.

We claim:

1. A device for depolymerizing used and waste plastics, comprising a closed reactor having
   a) a charging device for the used and waste plastics;
   b) a discharging device for the depolymerized material;
   c) a device for removing the gases produced and the condensable products in the head region of the reactor; and
   d) a circulation system connected to the reactor, and including a heater for mildly heating the reactor contents which traverse a riser section integrated into the reactor for removing fairly coarse solid particles having correspondingly high settling rate before entry into the take-off line.

2. The device according to claim 1, wherein the riser section is designed in the form of a pipe fitted essentially vertically in the reactor.

3. The device according to claim 1, wherein the riser section is formed by a partition which subdivides the reactor into segments.

4. The device according to claim 1, wherein the reactor tapers in the base region.

5. The device according to claim 1, wherein the circulation system for mildly heating the reactor contents comprises a take-off line, a feedline as well as a pump and an oven/heat exchanger.

6. The device according to claim 1, wherein an essentially vertical downcomer section having a branch fitted essentially at right angles thereto is connected downstream of the discharging device.

7. The device according to claim 6, wherein the branch is fitted with mechanical separating aids.

8. The device according to claim 6, wherein the downcomer section is provided with a sluice at its lower end.

9. The device according to claim 8, further comprising a charging device for flushing oil fitted above the sluice.

10. The device according to claim 9, further comprising a separating device for separating flushing oil and solid particles connected downstream of the sluice.

11. The device according to claim 6, wherein a separating device is connected downstream of the downcomer section.

12. The device according to claim 11, wherein a charging device for flushing oil is fitted to the separating device.

13. The device according to claim 11, wherein a sluice is connected downstream of the separating device.

14. The device according to claim 10, wherein the separating device is a trough scraper or a worm conveyor.

15. A process for depolymerizing used and waste plastics, comprising treating used or waste plastics at elevated temperature in a device in accordance with claim 1, comprising the step of mildly heating the reactor contents with said circulation system.

16. The process according to claim 15, further comprising adding by means of a charging device a flushing oil which has higher density than that of the depolymerized material in an amount which causes a low, upwardly directed flow velocity of the liquid inside a downcomer section between the charging device and a branch fitted essentially at right angles thereto.

17. The process according to claim 16, wherein the depolymerized material removed from the reactor passes through the downcomer section and a flow of organic, essentially liquid constituents of the depolymerized material is diverted through the branch, while solid particles having adequate settling rate pass through that part of the downcomer section which is filled with flushing oil.

18. The process according to claim 17, wherein the solid particles are discharged via a sluice connected downstream of the separating device with some of the flushing oil after passing through the downcomer section.

19. The process according to claim 18, wherein the solid particles are removed from the mixture discharged via the sluice by means of a separating device.

20. The process according to claim 19, wherein heavier flushing oil is washed out in the separating device by applying a lighter flushing oil.

21. The process according to claim 15, wherein the solid particles traverse a separating device after passing through the downcomer section.

22. The process according to claim 21, wherein solid particles, which are substantially freed from flushing oil, are discharged via a sluice.

* * * * *